(12) United States Patent
Sasano

(10) Patent No.: US 11,709,154 B2
(45) Date of Patent: Jul. 25, 2023

(54) LIQUID CHROMATOGRAPH INCLUDING PASSAGE SWITCH VALVE

(71) Applicant: AiSTI SCIENCE CO., Ltd., Wakayama (JP)

(72) Inventor: Ryoichi Sasano, Wakayama (JP)

(73) Assignee: AISTI SCIENCE CO., LTD., Wakayama (JP)

( * ) Notice: Subject to any disclaimer, the term of this patent is extended or adjusted under 35 U.S.C. 154(b) by 237 days.

(21) Appl. No.: 17/067,127

(22) Filed: Oct. 9, 2020

(65) Prior Publication Data

US 2021/0123892 A1    Apr. 29, 2021

(30) Foreign Application Priority Data

Oct. 17, 2019   (JP) ................................. 2019-190535
Oct. 28, 2019   (JP) ................................. 2019-195166

(51) Int. Cl.
*G01N 30/38*   (2006.01)
*G01N 30/32*   (2006.01)
*G01N 30/16*   (2006.01)

(52) U.S. Cl.
CPC ............ *G01N 30/38* (2013.01); *G01N 30/16* (2013.01); *G01N 30/32* (2013.01); *G01N 2030/326* (2013.01); *G01N 2030/385* (2013.01)

(58) Field of Classification Search
CPC ........ G01N 30/16; G01N 30/32; G01N 30/38; G01N 2030/207; G01N 2030/326; G01N 2030/385
See application file for complete search history.

(56) References Cited

U.S. PATENT DOCUMENTS

| | | | |
|---|---|---|---|
| 8,343,774 B2* | 1/2013 | Cormier | G01N 30/38 |
| | | | 73/61.52 |
| 9,370,729 B2* | 6/2016 | Vorm | B01D 15/163 |
| 10,175,210 B2* | 1/2019 | Vorm | B01D 15/163 |
| 10,209,229 B2* | 2/2019 | Albrecht, Jr. | G01N 30/38 |
| 10,478,749 B2* | 11/2019 | Wikfors | G01N 30/32 |
| 10,514,327 B2* | 12/2019 | Nakamura | G01N 1/14 |
| 10,668,464 B2* | 6/2020 | Tomita | G01N 30/16 |
| 10,690,637 B2* | 6/2020 | Yasunaga | G01N 30/24 |
| 11,280,768 B2* | 3/2022 | Wachinger | G01N 30/60 |
| 11,340,199 B2* | 5/2022 | Venkatramani | B01D 15/1885 |
| 2011/0209532 A1* | 9/2011 | Maeda | G01N 30/24 |
| | | | 73/61.56 |
| 2017/0106364 A1* | 4/2017 | Tomita | G01N 35/1095 |

(Continued)

FOREIGN PATENT DOCUMENTS

| | | | |
|---|---|---|---|
| JP | 4313501 B2 | 8/2009 | |
| JP | 4913470 B2 | 4/2012 | |

(Continued)

*Primary Examiner* — John Fitzgerald
(74) *Attorney, Agent, or Firm* — Kratz, Quintos & Hanson, LLP

(57) ABSTRACT

A liquid chromatograph includes: an analysis column; a sample loop that temporarily contains a mixed liquid of a sample and a mixture solvent; and a passage switch valve capable of switching a passage between a load position where the mixed liquid is temporarily held in the sample loop and an injection position where the mixed liquid held in the sample loop is sent to the analysis column. In the liquid chromatograph, a specific passage is formed in each of the load position and the injection position.

11 Claims, 13 Drawing Sheets

(56) References Cited

U.S. PATENT DOCUMENTS

2020/0033302 A1\* 1/2020 Yasunaga ............... G01N 30/20
2020/0340956 A1\* 10/2020 Ortmann ................ G01N 30/20
2022/0128520 A1\* 4/2022 Okoba ............... G01N 35/1016

FOREIGN PATENT DOCUMENTS

JP            6260719 B2 \* 1/2018 ............. G01N 30/08
JP            6409971 B2    10/2018

\* cited by examiner

LIQUID CHROMATOGRAPH INCLUDING PASSAGE SWITCH VALVE

TECHNICAL FIELD

The present invention relates to a liquid chromatograph including a passage switch valve.

BACKGROUND ART

Regarding liquid chromatographs including a passage switch valve, there have been heretofore proposed those in which various passages can be formed according to purposes (Patent Literatures 1 to 3, for example).

Patent Literature 1 discloses a high-performance liquid chromatograph including a trap column that concentrates a sample, a passage switch valve, an analysis column, and so on. In the high-performance liquid chromatograph, a passage for introducing a sample to the trap column and a passage for introducing components concentrated in the trap column into the analysis column can be switched, using the passage switch valve. In the invention of Patent Literature 1, the locations of ports in the passage switch valve and connecting ways of the ports are designed so as to avoid occurrence of an impact due to change in the pressure upon switching the passages.

Patent Literature 2 discloses a liquid chromatograph provided with an autosampler that includes a needle, a syringe pump for absorbing and discharging a sample through the needle, a needle driving mechanism for moving the needle, a sample loop for holding the sample absorbed by the syringe pump, and a passage switching mechanism for switching passages between a loading mode and an injecting mode. In the invention of Patent Literature 2, two or more kinds of solvents are mixed and supplied as a mobile phase. When high-pressure gradient analysis in which a ratio in concentrations of the mixture is gradually changed is performed, a time period required for reflection of the gradient on a composition of the mobile phase flowing in the analysis column is reduced. Thus, rapid analysis can be achieved.

Patent Literature 3 discloses a liquid chromatograph that performs separation and analysis in a manner that a sample and a diluted solution are introduced in a concentration column through an analysis-passage switch valve so as to be concentrated, and then the analysis-passage switch valve is switched to allow the concentration column to be connected to an analysis passage, to thereby introduce the sample from the concentration column into the analysis passage. The liquid chromatograph includes an absorption/discharge unit for absorbing and discharging a liquid, a diluted solution container containing the diluted solution, a passage selection valve joined by a passage connected to the absorption/discharge unit and a passage connected to the diluted solution container. With this passage selection valve, a mechanism for diluting a sample to be introduced in the concentration column can be achieved with a simple configuration.

CITATION LIST

Patent Literature

Patent Literature 1: Japanese Patent No. 4913470
Patent Literature 2: Japanese Patent No. 6409971
Patent Literature 3: Japanese Patent No. 4313501

SUMMARY OF INVENTION

Technical Problem

When a sample is analyzed using a typical liquid chromatograph, a sample liquid is injected as it is in a sample loop or the like, and then a passage switch valve is switched to push, by a mobile phase, the sample which is temporarily held in the sample loop, to thereby introduce the sample in an analysis column. Here, if such an introducing method of the sample into the analysis column is used and the polarity of a solvent in the sample is close to the polarity of the analysis column, components in the sample are not concentrated at a tip end of the analysis column, and flow therethrough without being concentrated. This causes a peak to be broad and the sensitivity to be lowered.

In order to address the above problem, the invention of Patent Literature 1 is provided with the trap column, and the invention of Patent Literature 3 is provided with the concentration column. However, the polarity of an elute for eluting the concentrated sample from these columns may be close to the polarity of the analysis column. In addition, in the invention of Patent Literature 3, a configuration of feeding a diluted solution is complicated, and thus manufacturing cost of the device, maintenance cost thereof, and so on are worthy of consideration. The configuration of the invention disclosed in Patent Literature 2 cannot address the aforementioned problem.

In view of the above, a purpose of the present invention is to provide a liquid chromatograph that can easily change the polarity of a solvent in a sample, so as to have preferable sensitivity.

Solution to Problem

The present inventor has conducted earnest investigation for solving the above-mentioned problems. As a result of the investigation, the inventor has found that the problems can be solved by using a predetermined passage switch valve, and locating units to be individually connected to ports of the passage switch valve at the predetermined positions.

An aspect of the present invention relates to a liquid chromatograph including: a sample receiving part that receives a sample supplied by a sample supply pump; a mixture solvent supply pump for supplying a mixture solvent to be mixed with the sample at a predetermined mixture ratio; a sample loop that temporarily contains a mixed liquid of the sample and the mixture solvent, and has one end and the other end; an analysis column that performs separation on the sample into components; a detector that detects the components obtained by the separation in the analysis column; a mobile phase supply pump for sending a mobile phase to the analysis column; and a passage switch valve capable of switching a passage between a load position where the mixed liquid is temporarily held in the sample loop and an injection position where the mixed liquid held in the sample loop is sent to the analysis column, in which the passage switch valve has ports each of which is individually connected to: the sample receiving part; the mixture solvent supply pump; the one end and the other end of the sample loop; the analysis column; and the mobile phase supply pump, in the load position, passages (a) and (b) are formed, the passage (a) allowing communication between the ports respectively connected to the mixture solvent supply pump, the sample receiving part, and the one end of the sample loop, and the (b) allowing communication between the ports respectively connected to the mobile phase supply pump and the analysis column, and in the injection position, passages (d), (e), and f are formed, the passage (d) allowing communication between the ports respectively connected to the sample receiving part and the mixture solvent supply pump, the passage (e) allowing communication between the ports respectively connected to the one end of the sample loop and the analysis column, and the passage f allowing communication between the ports respectively connected to the other end of the sample loop and the mobile phase supply pump.

In one aspect of the present invention, the passage switch valve may have a waste liquid port to be connected to the waste liquid container for collecting waste liquid. In the load position, a passage (c) allowing communication between the waste liquid port and the port connected to the other end of the sample loop may be formed. In the injection position, the waste liquid port may not communicate with other ports.

Another aspect of the present invention may include a solid phase cartridge that is detachably attached to the sample receiving part, and carries the sample in advance, an eluent solvent supply pump serving as the sample supply pump, for supplying an eluent solvent for eluting the sample carried by the solid phase cartridge, and a connecting portion connected to the eluent solvent supply pump and detachably coupled to the solid phase cartridge.

A still another aspect of the present invention may include a solvent switch valve in a passage between the eluent solvent supply pump and the connecting portion. The solvent switch valve may have ports respectively connected to; the connecting portion; the eluent solvent supply pump; and a preparation liquid supply pump for supplying a preparation liquid that does not elute the sample carried by the solid phase cartridge. The solvent switch valve may be capable of switching a passage g allowing communication between the eluent solvent supply pump and the connecting portion, and a passage i allowing communication between the preparation liquid supply pump and the connecting portion.

A still another aspect of the present invention may include a connecting adopter capable of being detachably attached, in place of the solid phase cartridge, to the sample receiving part and the connecting portion. The connecting adopter may allow, after the mixed liquid in the sample loop is sent to the analysis column, the eluent solvent to be supplied as a washing liquid, in the load position. In addition, the preparation liquid may be supplied as the washing liquid in this case.

A still another aspect of the present invention may include: a sample container that contains the sample; a connecting portion provided with a needle detachably connected to the sample container and the sample receiving part; and the sample supply pump for absorbing and discharging the sample through the needle.

A still another aspect of the present invention may include a driving mechanism that moves the connecting portion.

A still another aspect of the present invention may include a controller configured to perform a mixed liquid preparation step and an analysis step after the mixed liquid preparation step. In the mixed liquid preparation step, the controller causes: the passage switch valve to be in the load position; the sample injected by the sample supply pump and the mixture solvent injected by the mixture solvent supply pump to be joined in the passage (a) at a predetermined mixture ratio; and the mixed liquid to be sent from the one end of the sample loop to the other end thereof to be held in the sample loop. In the analysis step, the controller causes: the passage switch valve to be in the injection position; the mobile phase to be sent by the mobile phase supply pump from the other end of the sample loop to the one end thereof through the passage f; and the mixed liquid held in the sample loop to be sent to the analysis column through the passage (e).

In a still another aspect of the present invention, the sample loop may be provided with an oscillation imparting mechanism that promotes mixture of the sample and the mixture solvent.

Advantageous Effects of Invention

According to the present invention, a liquid chromatograph that has preferable sensitivity, and can easily change the polarity of a solvent in a sample, can be provided.

DESCRIPTION OF EMBODIMENTS

First Embodiment

A liquid chromatograph according to the first embodiment is described, with reference to the drawings.

Figure 1:
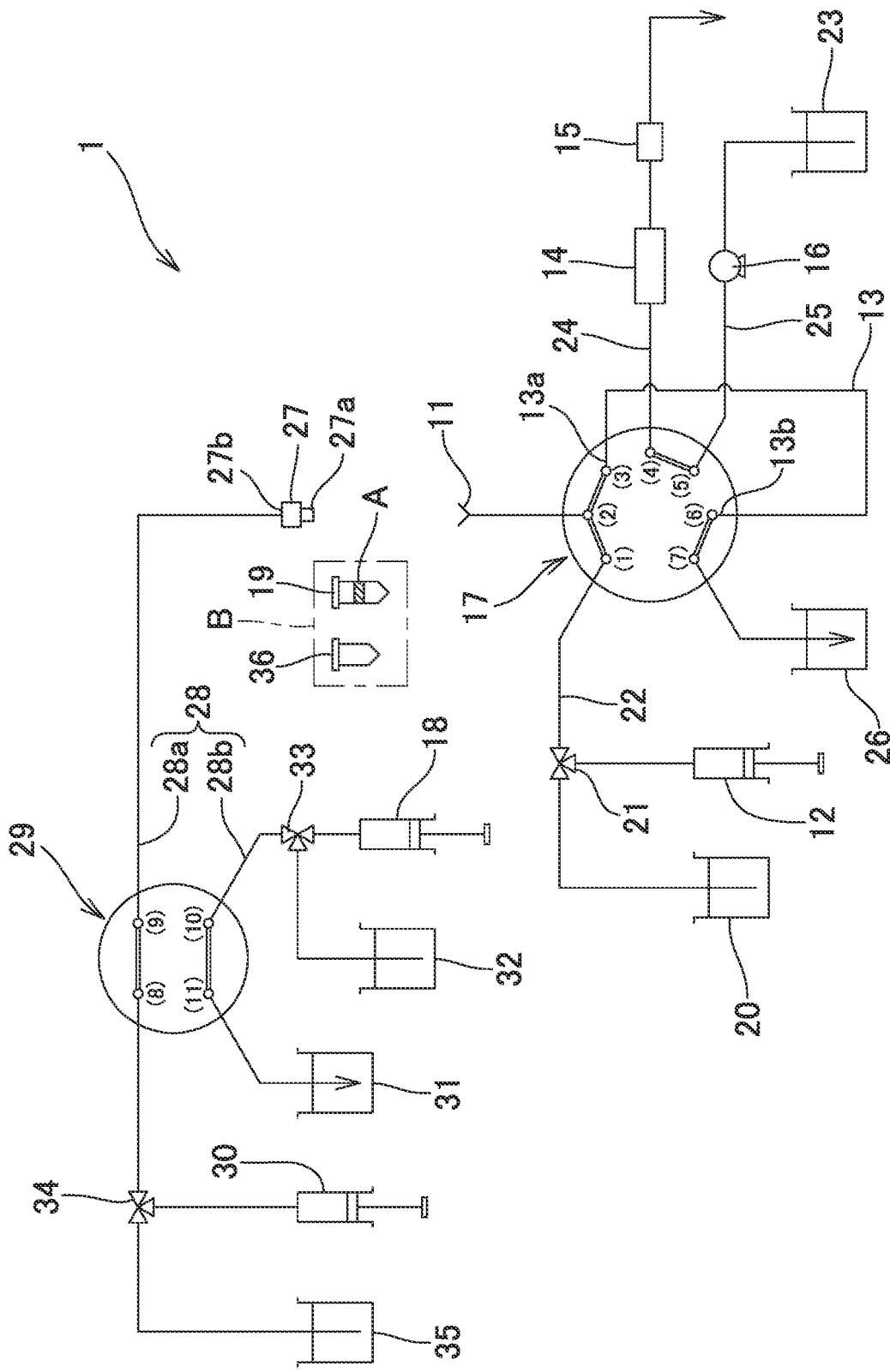
FIG. 1 is an explanation diagram for showing a passage configuration of a liquid chromatograph according to an example of a first embodiment, and shows the passage configuration in a suspended state.

FIG. 1 is an explanation drawing for describing a passage configuration of a liquid chromatograph 1 according to the first embodiment. In the first embodiment, a solid phase cartridge that carries a sample is used, and an eluent solvent for eluting the sample from the solid phase cartridge is supplied using an eluent solvent supply pump, for sending the sample to a sample receiving part. The liquid chromatograph 1 having the passage configuration shown in FIG. 1 is an example of the first embodiment. The liquid chromatograph 1 includes: a sample receiving part 11; a mixed solvent supply pump 12; a sample loop 13, an analysis column 14; a detector 15; a mobile phase supply pump 16; and a passage switch valve 17. FIG. 1 shows the liquid chromatograph 1 in a suspended state.

The sample receiving part 11 receives a sample A supplied using an eluent solvent supply pump 18 that serves as a sample supply pump. In the present embodiment, the sample A flows together with the eluent solvent for eluting the sample A from a solid phase cartridge 19. The sample receiving part 11 is connected to a port 2 of the passage switch valve 17, as described later. In the example shown in FIG. 1 the sample receiving part 11 is configured to receive, in a detachable manner, the solid phase cartridge 19 that carries the sample A in advance. It should be noted that the solid phase cartridge 19 may be connected to the sample receiving part 11 directly, or indirectly via a predetermined connection tool. Such a connection tool may have a needle as a part that is connected to the sample receiving part 11, so as to communicate with the inside of the solid phase cartridge 19. The sample receiving part 11 has a configuration with which the liquid tight condition with the solid phase cartridge 19 (including the connection via the connection tool) can be maintained. It is possible to adopt a well-known configuration for the aforementioned detachable configuration and the configuration in which liquid tight condition can be maintained. For the solid phase cartridge 19, cartridges respectively disclosed in Japanese Patent No. 6187133, and JP 2017-090411 A can be used, for example. For such a solid phase cartridge, commercially available products can be used, e.g., Flash-SPE, Presh-SPE, Smash-SPE, and AiSTI-SPE, which are produced by AiSTI SCIENCE Co., Ltd. The eluent solvent can be selected according to components of the sample A and properties of a solid phase of the solid phase cartridge.

The solid phase cartridge carrying the sample A can be obtained in accordance with methods disclosed in WO 2016/024575 A and WO 2017/115841 A, for example. In an aspect of the present invention, a sample may be carried by the solid phase cartridge in accordance with the methods disclosed in these Patent literatures, but the sample is not eluted by a preparation solvent, and is subjected to processing until the sample is elutable by the eluent solvent.

The mixture solvent supply pump 12 is used to supply a mixture solvent that is to be mixed with the sample A so that the sample A and the mixture solvent are mixed at the predetermined mixture ratio. The mixture solvent supply pump 12 is connected to a port 1 of the passage switch valve 17 through a passage 22, as described later. In the example shown in FIG. 1, the pump 12 is a syringe pump, but is not limited thereto. The pump 12 is also connected, through a three-way valve 21, to a mixture solvent container 20 in which the mixture solvent is retained. With this configuration, the mixture solvent can be supplied to the pump 12 when needed.

The sample loop 13 temporarily holds the mixed liquid of the sample A and the mixture solvent. The sample loop 13 has one end 13a connected to a port 3 of the passage switch valve 17, and the other end 13b connected to a port 6 of the passage switch valve 17, as described later. The sample loop 13 may be provided with an oscillation imparting mechanism for promoting the mixture of the sample A and the mixture solvent, for further uniformly mixing the sample A and the mixture solvent. For such an oscillation imparting mechanism, there is no particular limitation, as long as it can cause the sample loop 13 to oscillate and thus cause the oscillation of the mixed liquid in the sample loop 13 so as to promote the mixture of the sample A and the mixture solvent. Examples of the oscillation imparting mechanism include: a mechanism that applies, to a sample loop, oscillation generated by an ultrasonic wave oscillator to cause the sample loop to oscillate; a mechanism that flicks the sample loop 13 to oscillate; and so on. In view of a mixing efficiency, etc., a device provided with the ultrasonic wave oscillator is preferable.

In the analysis column 14, the sample A is subjected to separation into each component, and the components separated in the analysis column 14 are detected in the detector 15. The mobile phase supply pump 16 is used to supply, to the analysis column 14, mobile phases retained in a mobile phase retention container 23. The analysis column 14 is connected, in its upstream side, to a port 4 of the passage switch valve 17 through a passage 24, and is connected, in its downstream side, to the detector 15. The mobile phase supply pump 16 is connected, in its downstream side, to a port 5 of the passage switch valve 17 through a passage 25.

The passage switch valve 17 has ports 1 to 7 in this example. The ports 1 to 7 are respectively connected to: the mixture solvent supply pump 12 (port 1); the sample receiving part 11 (port 2); the one end 13a of the sample loop 13 (port 3); the analysis column 14 (port 4); the mobile phase supply pump 16 (port 5); and the other end 13b of the sample loop 13 (port 6). Here, the port 7 is connected to a waste liquid container 26 so as to work as a waste liquid port. In the example shown in FIG. 1, the ports 1 to 7 are located in this order in the clockwise direction on the circumference of a single circle. Intervals between the respective ports on the circumference are not particularly limited as long as passages in a load position and an injection position (described later) can be formed. In the example shown in FIG. 1, seven ports are selected, which are continuously located at an equal interval, and are located in seven positions among eight positions obtained by equally dividing the circumference into eight.

The passage switch valve 17 can be switched between the load position and the injection position. When the passage switch valve 17 is in the load position, the mixed liquid of the sample A and the mixture solvent is temporarily held in the sample loop 13. In the injection position, the mixed liquid held in the sample loop 13 is sent to the analysis column 14. When the passage switch valve 17 is in the load position, a passage (a) through which the ports 1 to 3 communicate with one another, a passage (b) through which the ports 4 and 5 communicate with each other, and a passage (c) through which the ports 6 and 7 communicate with each other are formed (see FIG. 2). When the passage switch valve 17 is in the injection position, a passage (d) through which the ports 1 and 2 communicate with each other, a passage (e) through which the ports 3 and 4 communicate with each other, and a passage f through which the ports 5 and 6 communicate with each other are formed (see FIG. 4). At this time, the port 7 communicates with no port, and thus is isolated.

As mentioned above, when the passage switch valve 17 is positioned in the load position, the mixture solvent is supplied from the upstream side of the passage (a) in the passage switch valve 17, and the sample A is joined to the mixture solvent and sent to the downstream side with being mixed with the mixture solvent. With this configuration, a total amount or a necessary amount of the sample A is used, and the mixed liquid in which the sample A and the mixture solvent are preferably mixed is temporarily held in the sample loop 13. Then, the passage switch valve is switched to the injection position, so that the mixed liquid in the sample loop 13 is pushed toward the analysis column 14 by the mobile phase, thereby introducing the mixed liquid into the analysis column 14. The polarity of the mixed liquid is adjusted by the mixture solvent, taking the polarity of the analysis column 14 into account, thereby performing measurement with preferable sensitivity. When acetonitrile is used as the eluent solvent, water may be used as the mixture solvent, for example. In this case, the mixed liquid containing the sample A has a polarity opposite to characteristics of the analysis column. Accordingly, the moving speed of the respective components of the sample A contained in the mixed liquid that is sequentially supplied from the sample loop 13 is reduced at around an entrance of the analysis column 14, so that the components are concentrated. The concentrated components are moved to an exit of the analysis column 14 by the mobile phase while being separated, and then detected in the detector 15, Thus, sharp peaks are exhibited for the respective components, thereby improving the sensitivity.

The passage switch valve 17 may be formed of, for example, a rotary valve that includes a stator provided with the ports 1 to 7 and a rotor in which three passage grooves for forming the passages (a) to f are provided. The load position and the injection position can be switched by rotating the rotor.

The example shown in FIG. 1 further includes a connecting portion 27. The connecting portion 27 is connected to the eluent solvent supply pump 18 that serves as the sample supply pump (hereinafter, simply referred to as "eluent solvent supply pump 18"). The connecting portion 27 and the eluent solvent supply pump 18 are connected to each other through a passage 28. The connecting portion 27 can be detachably coupled to the solid phase cartridge 19. The solid phase cartridge 19 and the connecting portion 27 can be connected to each other so that the liquid-tight condition can be maintained. The connecting portion 27 has a nozzle 27a detachably attached to the solid phase cartridge 19 and a main body 27b continuously provided from the nozzle 27a. The main body 27b will be united with a driving mechanism D (see FIG. 12), when the driving mechanism D is provided, as described later.

The example shown in FIG. 1 further includes a solvent switch valve 29 in the passage 28 between the eluent solvent supply passage 18 and the connecting portion 27. The solvent switch valve 29 has ports 8 to 11. The ports 8 to 11 are respectively connected to: a preparation liquid supply pump 30 (port 8); the connecting portion 27 (port 9); the eluent solvent supply pump 18 (port 10); and a waste liquid container 31 (port 11). Furthermore, the port 9 is connected to the connecting portion 27 through a passage 28a, and the port 10 is connected to the eluent solvent supply pump 18 through a passage 28b. The preparation liquid is a solution by which the sample A carried by the solid phase cartridge 19 is not eluted. Such a preparation liquid can be selected according to properties of the solid phase of the solid phase cartridge 19, by which the sample A is trapped.

The solvent switch valve 29 can be switched between an elute position and a preparation liquid position. In the elute position, a passage g through which the ports 9 and 10 communicate with each other is formed. In the preparation liquid position, a passage i through which the ports 9 and 8 communicate with each other is formed. In the example shown in FIG. 1, the passage g and a passage h through which the ports 8 and 11 communicate with each other are simultaneously formed, and the passage i and a passage j through which the ports 10 and 11 communicate with each other are simultaneously formed. It should be noted that FIG. 1 shows a state where the passages i and j are simultaneously formed.

The passage switch valve 29 may be formed of, for example, a rotary valve that includes a stator provided with the ports 8 to 11 and a rotor in which two passage grooves for forming the passages g to j are provided. The elute position and the preparation liquid position can be switched by rotating the rotor.

In the example shown in FIG. 1, the eluent solvent supply pump 18 and the preparation liquid supply pump 30 are both the syringe pump, but these pumps are not limited thereto. The eluent solvent supply pump 18 is connected to an eluent solvent container 32 in which the eluent solvent is retained, through the three-way valve 33. The eluent solvent can be supplied to the pump 18 depending on the necessity. The pump 30 is also connected to the preparation liquid container 35 in which the preparation liquid is retained, through a three-way valve 34. Thus, the preparation liquid can be supplied to the pump 30 depending on the necessity. The eluent solvent and the preparation liquid are also used as a washing liquid for washing the inside of each of the passages, as described later.

In the example shown in FIG. 1, a connecting adaptor 36 is prepared in advance, which can be detachably coupled to the sample receiving part and the connecting portion, in place of the solid phase cartridge 19. The connecting adopter 36 is used in place of the solid phase cartridge 19 as mentioned above, when the passage switch column 17 is switched to the load position after the mixed liquid in the sample loop 13 is sent to the analysis column 14, and the elution solvent or the preparation liquid is supplied to the predetermined passage as the washing liquid, which is described later.

In the example shown in FIG. 1, connection/separation between the sample receiving part 11 and one of the solid phase cartridge 19 and the connecting adapter 36, as well as between the solid phase cartridge 19 and one of the connecting portion 27 and the connecting adapter 36 may be performed by hand or by automatic control using the driving mechanism D that moves the connecting portion 27. The driving mechanism D may be a mechanism capable of moving the connecting portion 27 in the horizontal and vertical directions, for example. The driving mechanism D may be always united with the connecting portion 27 while the liquid chromatograph 1 is operated, for example. Alternatively, the driving mechanism D may have a mechanism that detachably holds the main body 27b of the connecting portion 27, while the liquid chromatograph 1 is operated.

Figure 12:
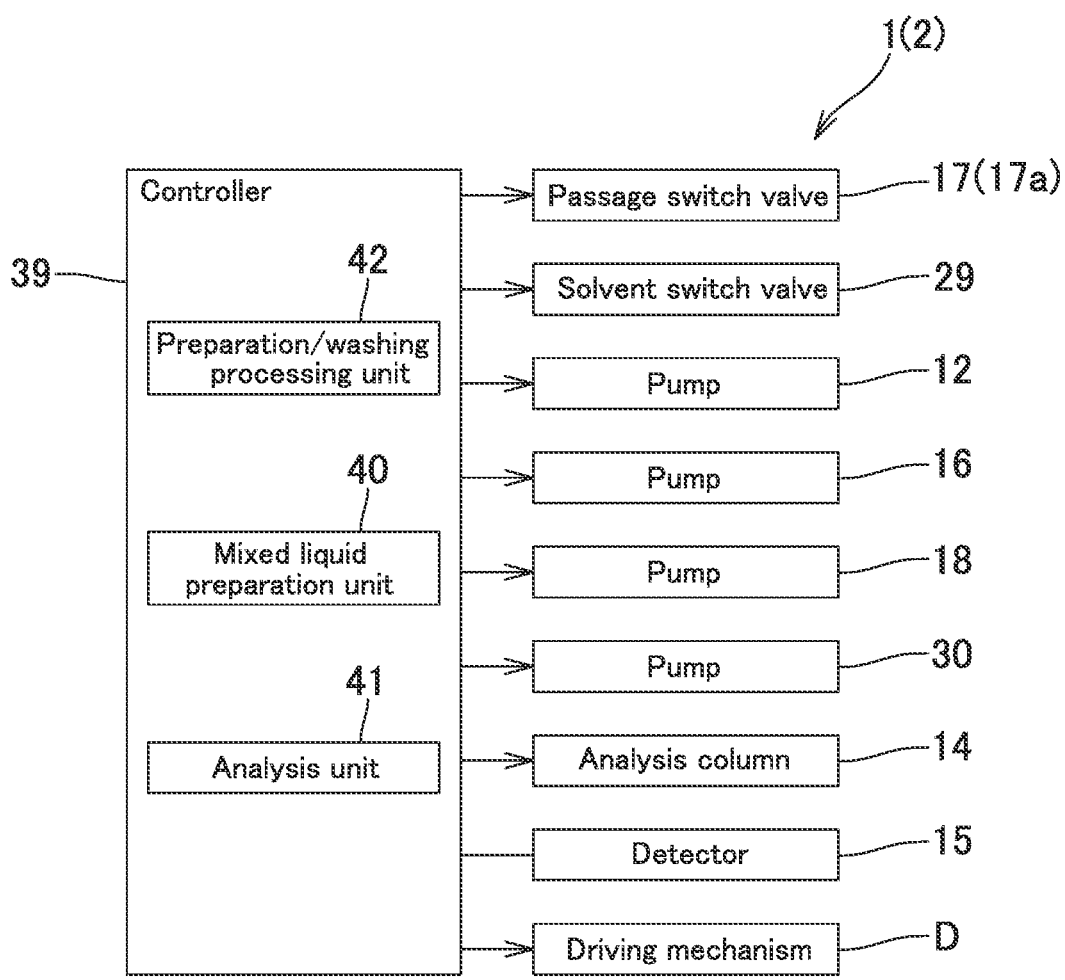
FIG. 12 is a block diagram showing an example of electric configuration of the liquid chromatograph according to the example and another example of the first embodiment.

The liquid chromatograph 1 may include: the valves 17 and 29; the pumps 12, 16, 18, and 30; the analysis column 14, and a controller 39 controlling the operation of the driving mechanism D that is an optional unit. FIG. 12 is a block diagram showing an example of electrical configuration of the liquid chromatograph 1 shown in FIG. 1.

The controller 39 includes for example: a central processing unit (CPU) for executing predetermined calculation processing; a storage section, such as a random access memory (RAM) for temporarily storing data, a non-volatile read only memory (ROM) for storing a predetermined control program or the like, a flash ROM, or a hard disk drive (HDD); a timer circuit; and peripheral circuits connected to the respective units. The controller 39 executes the aforementioned control program to thereby control operations of the valves 17 and 29, the pumps 12, 16, 18, and 30, and the analysis column 14. If the driving mechanism D that is an optional unit is provided, the controller 39 controls the operation of the driving mechanism D. The controller 39 also performs the calculation processing in response to detected signals from the detector 15. Furthermore, if the oscillation imparting mechanism that is an optional unit is provided, the controller 39 controls the operation of the oscillation imparting mechanism.

The controller 39 executes the aforementioned control program to work as a mixed liquid preparation unit 40 and an analysis unit 41. Furthermore, when preparation processing and washing processing which are described later are performed, the controller 39 functions as a preparation/washing processing unit 42.

Figure 13:
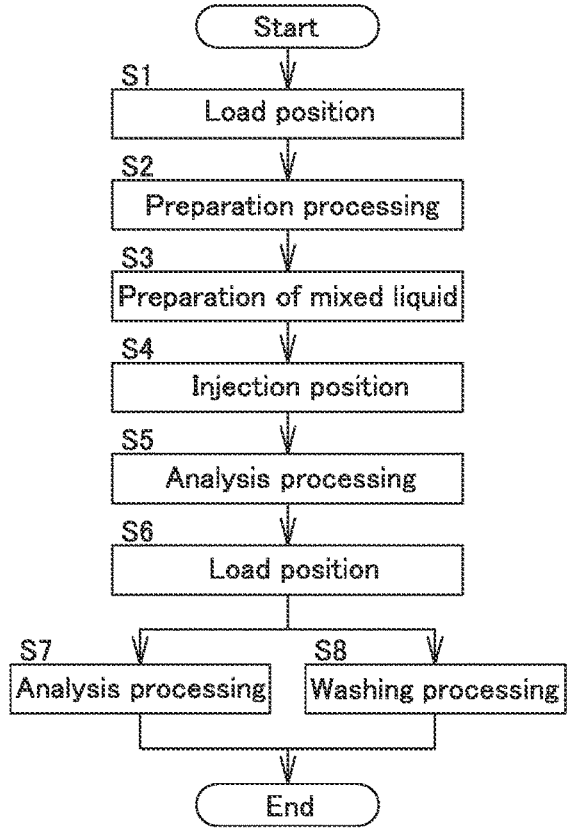
FIG. 13 is a flowchart showing an example of an operation of the liquid chromatograph according to the examples of the first and second embodiment.

Operations of the liquid chromatograph 1 are described with reference to FIGS. 1 to 6, 12, and 13. FIG. 13 is a flowchart showing an example of the operation of the liquid chromatograph 1 having the passage configuration shown in FIG. 1.

In the suspended state shown in FIG. 1, the operation can be started after the solid phase cartridge 19, the connecting portion 27, and the sample receiving part 11 communicate with one another in the liquid-tight manner. If the driving mechanism D is provided, the operation can be started after the solid phase cartridge 19 or both the solid phase cartridge 19 and the connecting adapter 36 are placed on a preparation stand B. When the operation is started, the preparation/washing processing unit 42 causes the passage switch valve 17 to be in the load position, and also causes the solvent switch valve 29 to be in the preparation liquid position (Step S1). If the driving mechanism D is provided, the preparation/washing processing unit 42 causes the driving mechanism D to operate for allowing the solid phase cartridge 19 to be connected with the connecting portion 27 and the sample receiving part 11 in the liquid-tight manner, and then allowing the valves 17 and 29 to respectively be in the load position and the preparation liquid position, similar to the case where the driving mechanism D is not provided.

The driving mechanism 1) may be a mechanism that performs the following operations, for example. The solid phase cartridge 19 or both the connecting adapter 36 and the solid phase cartridge 19 are previously placed on the preparation stand B, and then the connecting portion 27 is moved by the driving mechanism L) united with the connecting portion 27 to allow the nozzle 27a of the connecting portion 27 to fit with one end side of the solid phase cartridge 19 or the connecting adapter 36 so as to be connected therewith in the liquid tight manner. In this state, the connecting portion 27 is moved by the driving mechanism D to allow the sample receiving part 11 to fit with the other end side of the solid phase cartridge 19 or the connecting adapter 36 so as to be connected therewith in the liquid-tight manner. With this operation, the sample receiving part 11, the solid phase cartridge 19 or the connecting adapter 36, and the connecting portion 27 communicate with one another in this order. Meanwhile, the driving mechanism D causes the connecting portion 27 to move so as to release the connection between the sample receiving part 11 and the other end side of the solid phase cartridge 19 or the connecting adapter 36, to thereby release the connection between the connecting portion 27 and one of the solid phase cartridge 19 and the connecting adapter 36.

Figure 2:
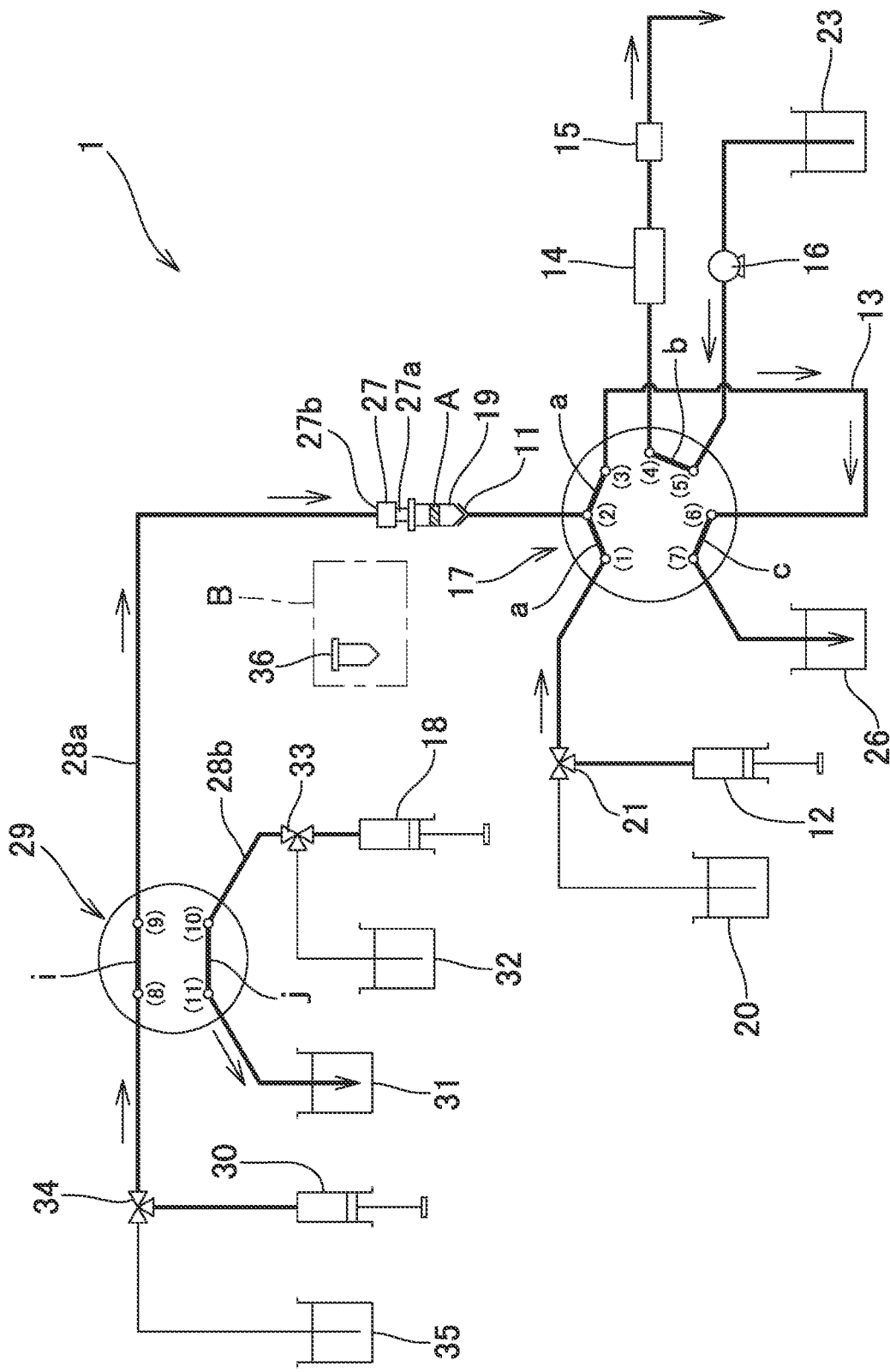
FIG. 2 is an explanation drawing for showing a passage configuration of the liquid chromatograph according to the example of the first embodiment, and shows a state where preparation processing is conducted.

FIG. 2 shows a state in which preparation processing (Step S2) is performed, in which the preparation/washing processing unit 42 causes the valves 17 and 29 to be in the respective predetermined positions from the suspended state shown in FIG. 1, and causes the pumps 12, 16, 18, and 30 to operate for sending a predetermined liquid to the solid phase cartridge 19 and the formed passages, to thereby remove air therein. In FIG. 2, bold lines indicate the passages through which liquid flows, and arrows indicate the directions along which the liquid flows. The same is applied to bold lines and arrows in FIGS. 3 to 11.

In Step S2, the preparation processing is performed as follows: (i) the preparation liquid is sent to the solid phase cartridge 19 using the pump 30 through the passages i and 28a and the connecting portion 27, and then the preparation liquid flows from the solid phase cartridge 19 through the passage (a), the sample loop 13, and the passage (c) so as to be discharged into the waste liquid container 26. At the same time, the mixture solvent is supplied using the pump 12 to be mixed with the preparation liquid in the passage (a), so as to be also discharged in the waste liquid container 26; (ii) the mobile phase is sent to the analysis column 14 using the pump 16 through the passage (b), and is discharged; and (iii) the eluent solvent is sent to the passage j using the pump 18, and is discharged in a waste liquid 31. At this time, the sample A keeps the state of being carried by the solid phase cartridge 19, Each liquid is supplied at a predetermined flow rate that is previously determined.

Figure 3:
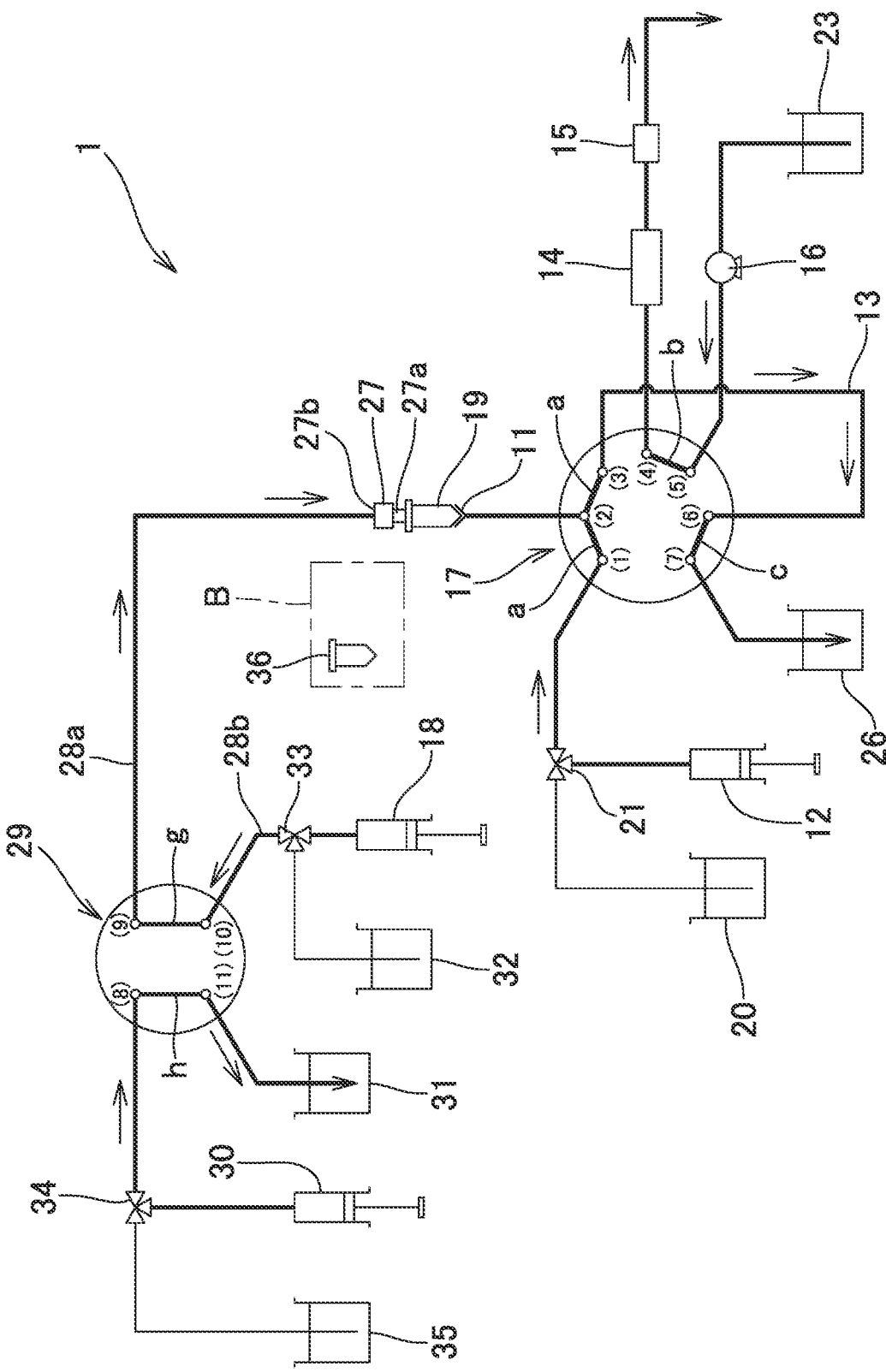
FIG. 3 is an explanation drawing for showing a passage configuration of the liquid chromatograph according to the example of the first embodiment, and shows a state where a mixed liquid is prepared.

The preparation processing (Step S2) is performed for a predetermined period of time, and then processing of preparing the mixed liquid (Step S3: mixed liquid preparation step) is performed. In Step S3, the mixed liquid preparation unit 40 causes the valves 17 and 29 to be positioned in the predetermined positions, and the pumps 12, 16, 18, and 30 to operate for sending a predetermined liquid to the solid phase cartridge 19 and the formed passages, to thereby elute the sample A from the solid phase cartridge 19. Then, the mixed liquid of the sample A and the mixed solvent is held in the sample loop 13, as shown in FIG. 3. In the present example, the mixed liquid contains the sample A, the eluent solvent, and the mixture solvent.

In Step S3, the mixed liquid is prepared, for example, as follows: (i) the valve 17 is kept in the load position, and the valve 29 is switched to the elute position to form the passages g and h. Then, the elute is sent to the solid phase cartridge 19 using the pump 18 through the passages g, 28a, and 28b, so that the sample A is eluted from the solid phase cartridge 19; (ii) at the port 2 of the passage (a), the sample A and the elute are joined to the mixture solvent so as to exhibit a predetermined mixture ratio for obtaining the mixed liquid; (iii) the obtained mixed liquid is sent from the one end of the sample loop 13 to the other end thereof, so that the mixed liquid is held inside the sample loop; and (iv) in parallel to processing of (i) to (iii), the preparation liquid is supplied using the pump 30 through the passage h and is discharged in the waste liquid container 31, and the mobile phase is sent to the analysis column 14 using the pump 16 through the passage (b), and is discharged. Depending on the necessity, the oscillation imparting mechanism may cause the sample loop 13 to oscillate for uniformly mixing the sample A and the mixture solvent in the mixed liquid which is to be sent to the sample loop 13. Such operation may be an intermittent manner and a continuous manner. An operation term can be appropriately determined within a term during which the mixed liquid exists in the sample loop 13, for example.

After the processing of preparing the mixed liquid (Step S3) is performed for a predetermined period of time, for example, the valve 17 is positioned in the injection position (Step S4). The processing term of the Step S3 is appropriately determined considering the capacity of the sample loop, the mixture ratio of the mixed liquid, the flow rate, and so on. In Step S4, the analysis unit 41 causes the valve 17 to operate in the injection position, to thereby form the passages (d), (e), and f. At this time, pumps 12, 18, and 30 are suspended, but the pump 16 operates continuously.

After Step S4, analysis processing 1 (Step S5) is performed in such a manner that the analysis unit 41 causes the mobile phase to be sent from the other end of the sample loop 13 to the one end thereof through the passage f, to thereby send the mixed liquid held inside the sample loop 13 through the passage (e) to the analysis column 14. At this time, the mixed liquid is pushed out from the sample loop 13 by the mobile phase, so that the mixed liquid is introduced in the analysis column.

Figure 4:
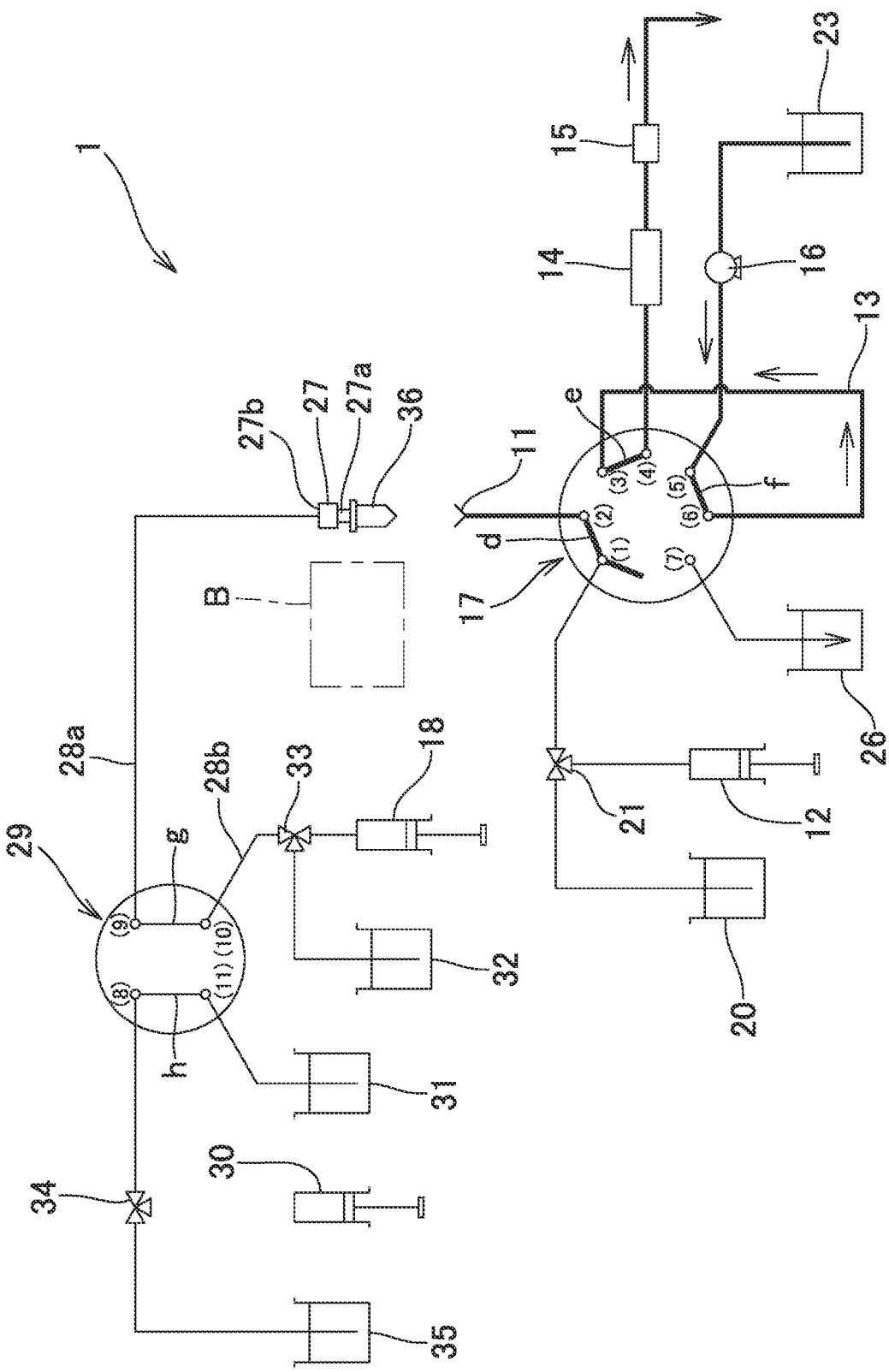
FIG. 4 is an explanation drawing for showing a passage configuration of the liquid chromatograph according to the example of the first embodiment, and shows a state where a solid phase cartridge is replaced with a connecting adaptor, in parallel to analysis processing with the passage switch valve being in an injection position.

Furthermore, in Step S5, the solid phase cartridge 19 from which the sample A is eluted is removed, and the connecting adopter 36 previously placed on the preparation stand B is connected to the connecting portion 27. Then, the connecting adopter 36 is connected to the sample receiving part 11, so that the connecting portion 27, the connecting adopter 36, and the sample receiving part 11 communicate with one another in the liquid tight manner. If the driving mechanism D is provided, the analysis unit 41 causes the driving mechanism D to move the connecting portion 27, to thereby exchange the solid phase cartridge 19 with the connecting adopter 36. FIG. 4 shows a state where the connecting adopter 36 communicates with the connecting portion 27 in Step S5.

Step S5 is started to allow the connecting portion 27, the connecting adopter 36, and the sample receiving part I 1 to communicate one another in the liquid tight manner. After a predetermined period of time passes, the valve 17 is caused to position in the load position (Step S6). In Step S6, the analysis unit 41 causes the valve 17 to be positioned in the injection position, to thereby form the passages (a), (b), and (c).

After Step S6, the analysis unit 41 causes the mobile phase to be supplied through the passage b, to thereby perform analysis processing 2 in which the mixed liquid is continuously sent to the analysis column (Step S7). In Step S7, calculation processing is performed in the analysis unit 41 in response to signals of components separated in the analysis column 14 and detected in the detector 15. After all the mixed liquid passes through the analysis column 14 and signals based on the components are not detected in the detector 15, it is preferable that the mobile phase is continuously supplied for washing the inside of the analysis column 14 and the passages.

The washing processing is performed (Step S8) in parallel to Step S7. In Step S8, washing processing 1 and washing processing 2 are performed as follows. In the washing processing 1, the preparation/washing processing unit 42 causes: (i) the pump 18 to operate for discharging the elute as a washing liquid to the waste liquid container 26 through the passage g in the valve 29, the passages 28a and 28b, the passage (a), the sample loop 13, and the passage (c); (ii) the pump 12 to operate for discharging the mixture solvent as the washing liquid to the waste liquid container 26 through the passage (a), the sample loop 13, and the passage (c); and (iii) the pump 30 to operate for discharging the preparation liquid as the washing liquid to the waste liquid container 26 through the passage h of the valve 29. The processing (i) and the processing (ii) are simultaneously performed, so that washing liquids in (i) and (ii) are joined in the port 2 of the valve 17.

In the washing processing 2, the preparation/washing processing unit 42 keeps the valve 17 in the load position, causes the valve 29 to be switched to the preparation liquid position, and causes the pump 30 to operate for sending the preparation liquid as the washing liquid to the passage 28a through the passage i. Then, as in the washing processing 1, the preparation liquid is discharged in the waste liquid container 26 in the end. The pump 18 is caused to operate for discharging the elute as the washing liquid to the waste liquid container 31 through the passage j.

Figure 5:
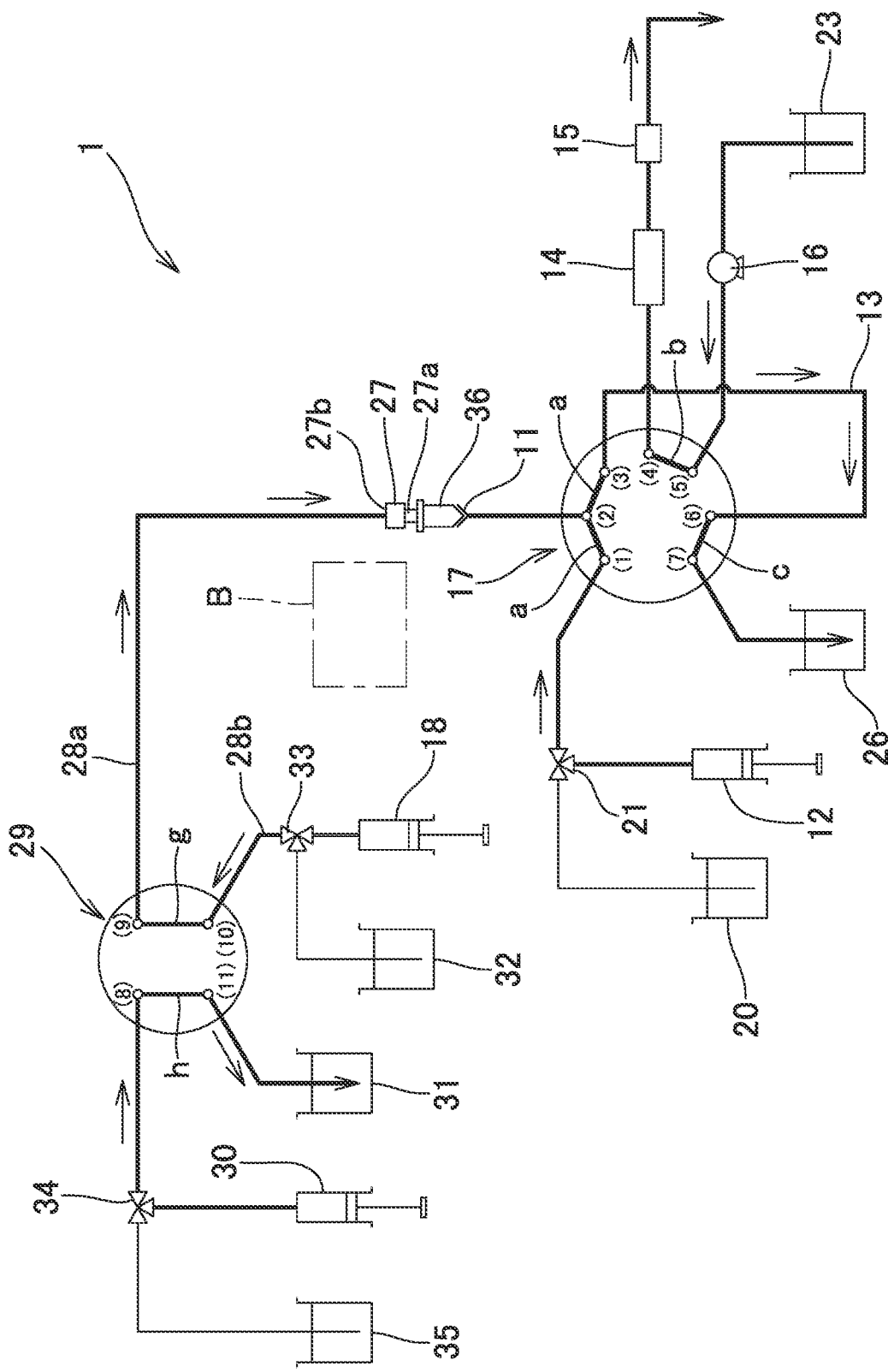
FIG. 5 is an explanation drawing showing a passage configuration of the liquid chromatograph according to the example of the first embodiment, and shows a state where washing processing is performed, in parallel to the analysis processing with the passage switch valve being in a load position.
Figure 6:
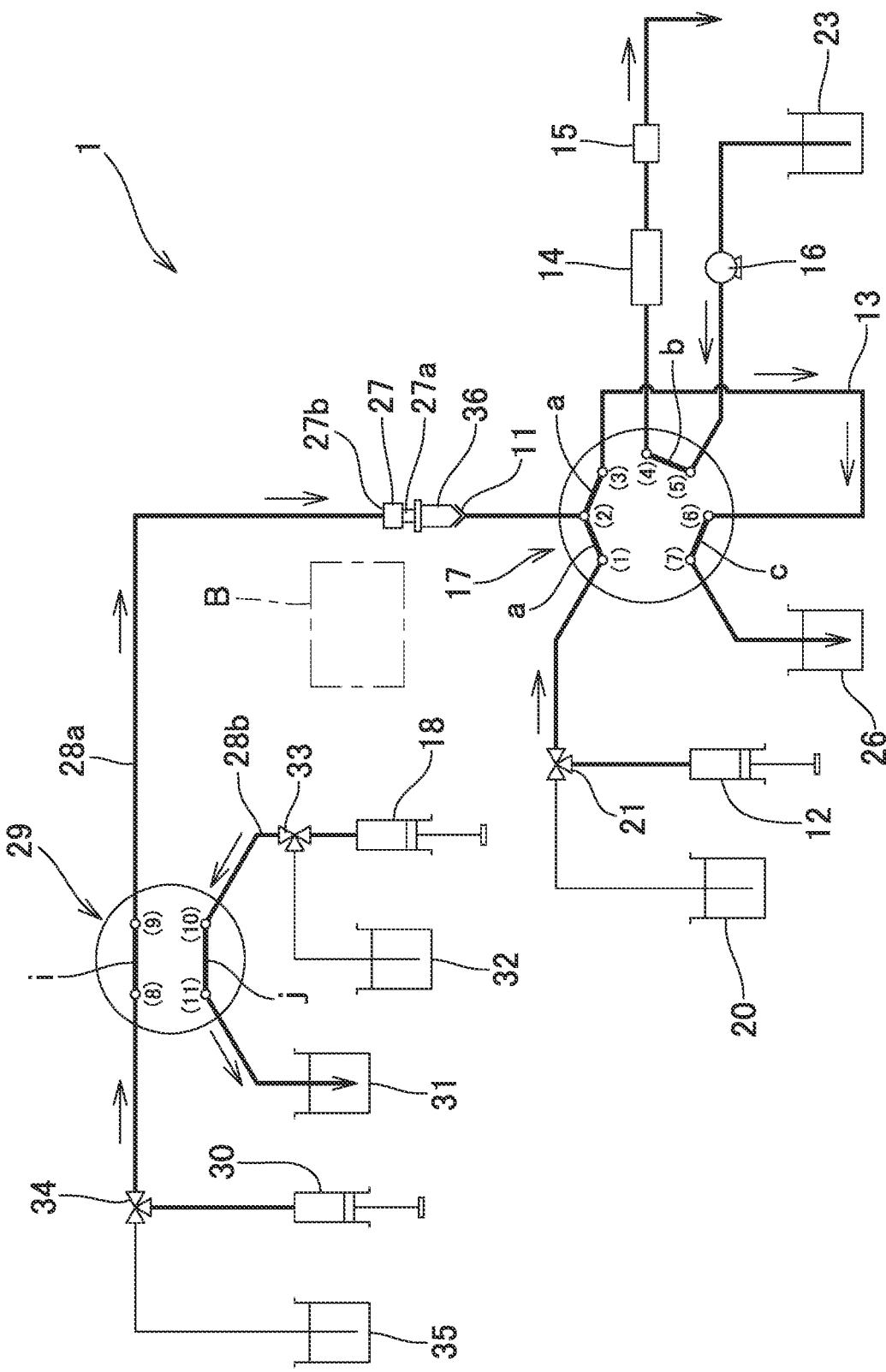
FIG. 6 is an explanation drawing showing a passage configuration of the liquid chromatograph according to the example of the first embodiment, and shows a state where another washing processing is performed, in parallel to the analysis processing with the passage switch valve being in the load position.

FIG. 5 shows a state where the washing processing 1 and the analysis processing 2 are performed. FIG. 6 shows a state where the washing processing 2 and the analysis processing 2 are performed. It should be noted that the processing in each of Steps S4 to S7 corresponds to the analysis step.

The analysis processing 2 and the washing processing 2 are performed for a predetermined period of time, then the analysis unit 41 causes the pump 16 to be suspended, and the preparation/washing processing unit 42 causes the pumps 12, 18, and 30 to be suspended. Thus, a series of processing is terminated. It should be noted that the connecting adopter 36 may be removed and placed on the preparation stand B after the pumps 12, 18, and 30 are suspended, depending on the necessity. If the driving mechanism D is provided, the driving mechanism D is driven after the preparation/washing processing unit 42 causes the pumps 12, 18, and 30 to be suspended, so that the connecting portion 27 is moved for removing the connecting adopter 36 from the sample receiving part 11. Thereafter, the connecting adopter 36 can be removed from the connecting portion 27 and be placed on the preparation stand B.

Modification of First Embodiment

Figure 7:
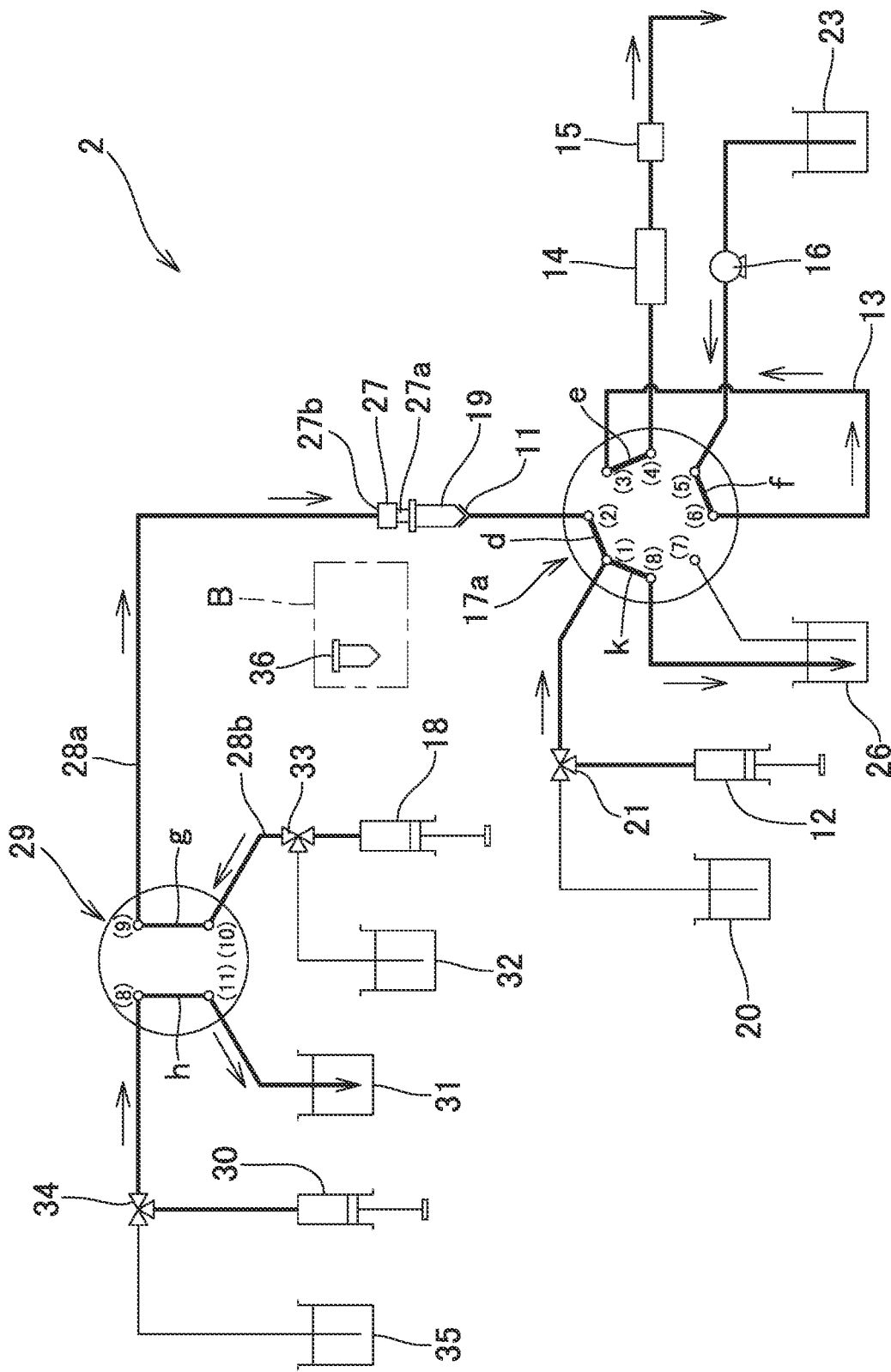
FIG. 7 is an explanation drawing for showing a passage configuration of the liquid chromatograph according to another example of the first embodiment, and shows a state where the solid phase cartridge is replaced with the connecting adaptor, in parallel to the analysis processing with the passage switch valve being in the injection position.

FIG. 7 shows a modification of the liquid chromatograph 1 shown in FIG. 1. A liquid chromatograph 2 shown in FIG. 7 further includes a waste liquid port that allows the elute or the preparation liquid to be discharged in the waste liquid container through the passage (d) formed when the passage switch valve 17 of the liquid chromatograph 1 shown in FIG. 1 is positioned in the injection position. Such a port is provided, so that the analysis processing and the washing processing can be concurrently performed without switching the passage switch valve to the load position again. The liquid chromatograph 2 has the configuration same as that of the liquid chromatograph 1 except for the waste liquid port, and can form passages same as those in the liquid chromatograph 1. Thus, in FIG. 7, the configurations same as those in the liquid chromatograph 1 are allocated by the same reference signs. The different configuration is described as follows.

The liquid chromatograph 2 shown in FIG. 7 has a passage switch valve 17a. In the passage switch valve 17a, the aforementioned waste liquid port is provided as a port 8 that serves as a second waste liquid port, in the switch valve 17 of the liquid chromatograph 1 shown in FIG. 1 and other drawings. In other words, the passage switch valve 17a has ports 1 to 8 which are, in this example, located in this order in the clockwise direction at equal intervals on the circumference of a single circle. In the load position, the passages (a), (b), and (c) which are the same as those of the switch valve 17, are formed. Meanwhile, in the injection position, a passage (d) through which the ports 1 and 2 communicate with each other, and a passage (k) through which the ports 1 and 8 communicate with each other are formed. In other words, in the injection position, the passages (d) and (k) through which ports 1, 2, and 8 communicate to one another are formed. The passages (d) and (k), allow the mixture solvent and one of the elute and the preparation liquid to be discharged from the port 8 to the waste liquid container 26.

The passage switch valve 17a may be formed of a rotary valve including a stator provided with the ports 1 to 8, and a rotor in which three passage grooves are formed for forming the passages (a) to (d) and (k). Here, the passage grooves formed in the rotor are the same as those formed in the switch valve 17 shown in FIG. 1.

Figure 14:
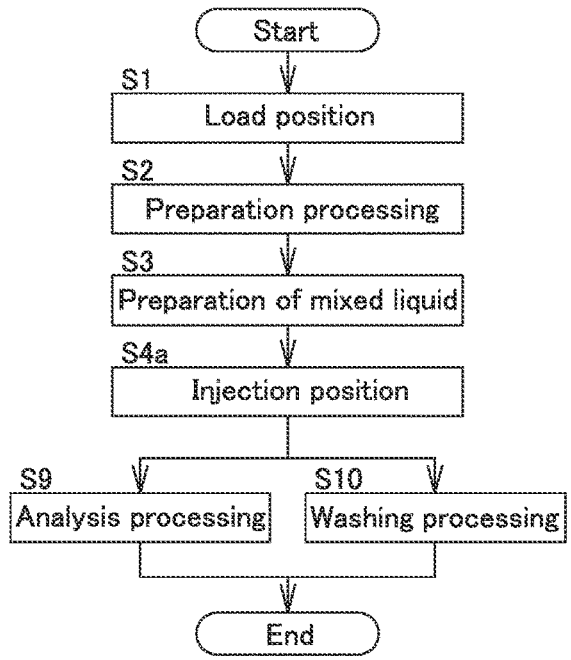
FIG. 14 is a flowchart showing an example of an operation of the liquid chromatograph according to the other example of the first embodiment.

The operation of the liquid chromatograph 2 is described with reference to FIGS. 7, 12, and 14. Operations common to those of the liquid chromatograph 1 shown in FIG. 1 are briefly described with reference to FIGS. 1 to 6, depending on the necessity. FIG. 14 is a flowchart showing an example of the operation of the liquid chromatograph 2 having the passage configuration shown in FIG. 7.

In the liquid chromatograph 2, processing in each of Step S1 to Step S3 as shown in FIGS. 2 and 3 is performed from the suspended state as shown in FIG. 1, in the similar manner as processing in the liquid chromatograph 1 shown in FIG. 1. After the mixed liquid is prepared (Step S3: the mixed liquid preparation step) for a predetermined time period, for example, the valve 17a is positioned in the injection position (Step S4a). In Step S4a, the analysis unit 41 causes the valve 17a to be positioned in the injection position, to thereby form the passages (d), (e), (f), and (k), and the pump 12, 16, 18, and 30 continuously operate, as shown in FIG. 7. As shown in FIG. 7, the analysis unit 41 causes the pumps 12 and 18 to operate for sending the mixture solvent from the port 1 to the port 8 through the passage (k), and the eluent solvent through the passage (g), passages 28a and 28b to the port 2 and further to the port 8 through the passages d and k, so as to discharge these solvents in the waste liquid container 26.

After Step S4a, analysis processing is performed in such a manner that the analysis unit 41 causes the mobile phase to be sent from the oilier end of the sample loop 13 to the one end thereof through the passage f, to thereby send the mixed liquid held inside the sample loop 13 to the analysis column 14 through the passage (e) (Step S9). In Step S9, the sample A sent from the sample loop 13 is subjected to the separation into each component, in the analysis column 14, Calculation processing is performed in the analysis unit 41 based on the respective signals detected in the detector 15. After the whole mixed liquid passes through the analysis column 14 and signals based on the components are not detected in the detector 15, the mobile phase may be continuously supplied for washing the inside of the analysis column 14 and the passages.

The washing processing is performed (Step S10) in parallel to Step S9. In Step S10, the preparation/washing processing unit 42 causes the pumps 12, 18, and 30 to operate for enabling washing processing as described below, for example: (i) washing processing is performed in the passage configuration shown in FIG. 7; (ii) washing processing is performed in the passage configuration same as that shown in FIG. 7 except for exchange of the solid phase cartridge 19 with the connecting adopter 36, as described above regarding Step S5; and (iii) washing processing is performed in the passage configuration shown in FIG. 6 after washing processing for a predetermined time period in the passage configuration shown in FIG. 5 by switching the passage switch valve 17a from the injection position to the load position, after signals based on the components of the sample A are not detected in the detector 15 in Step S9. The analysis processing and the washing processing are performed for a predetermined period of time, then the analysis unit 41 causes pump 16 to be suspended, and the preparation/washing processing unit 42 causes the pumps 12, 18, and 30 to be suspended. Thus, a series of processing is terminated. For the cases of the above (i) and (ii), the passage switch valve 17a may be switched from the injection position to the load position after the washing processing is performed. In the cases of the above (i) to (iii), the connecting adopter 36 may be placed on the preparation stand B depending on the necessity, as mentioned above.

Second Embodiment

FIGS. 8 to 11 show an example of the passage configuration of a liquid chromatograph 3 according to the second embodiment. The second embodiment corresponds to an example in which a sample is not carried by the solid phase cartridge unlike the first embodiment, but the sample is a liquid contained in a sample container 43. The example shown in FIGS. 8 to 11 has a configuration same as that shown in FIG. 1, but does not use a configuration of sending the eluent solvent unlike the example shown in FIG. 1 and has a connecting portion 37 that is provided with a needle 37a suitable for absorbing the liquid from a sample container 43. Thus, in FIGS. 8 to 11, the configurations same as those in the liquid chromatograph 1 are allocated by the same reference signs. The different configurations are described as follows.

Figure 8:
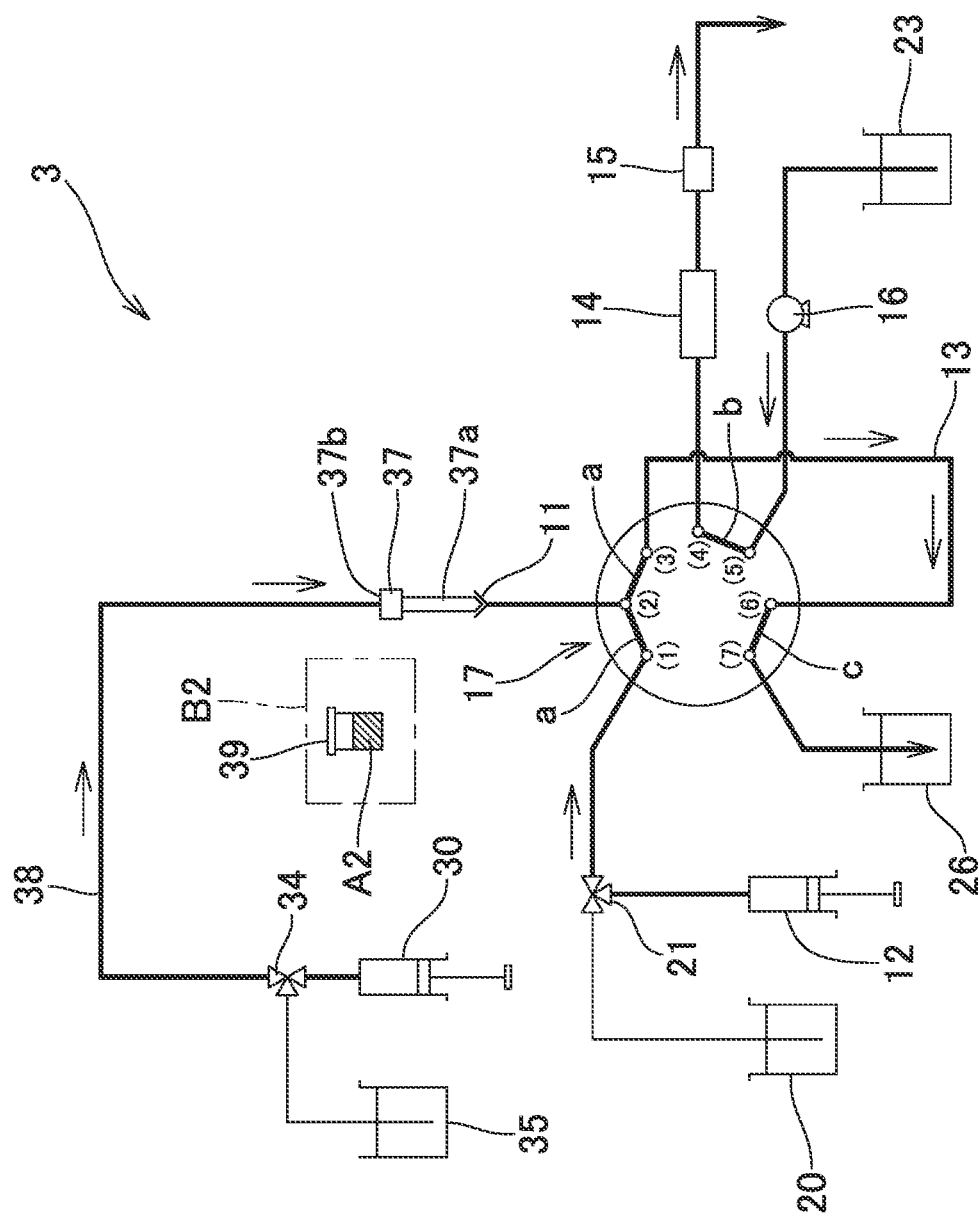
FIG. 8 is an explanation drawing for showing a passage configuration of a liquid chromatograph according to an example of a second embodiment, and shows a passage configuration when the preparation processing is performed.
Figure 9:
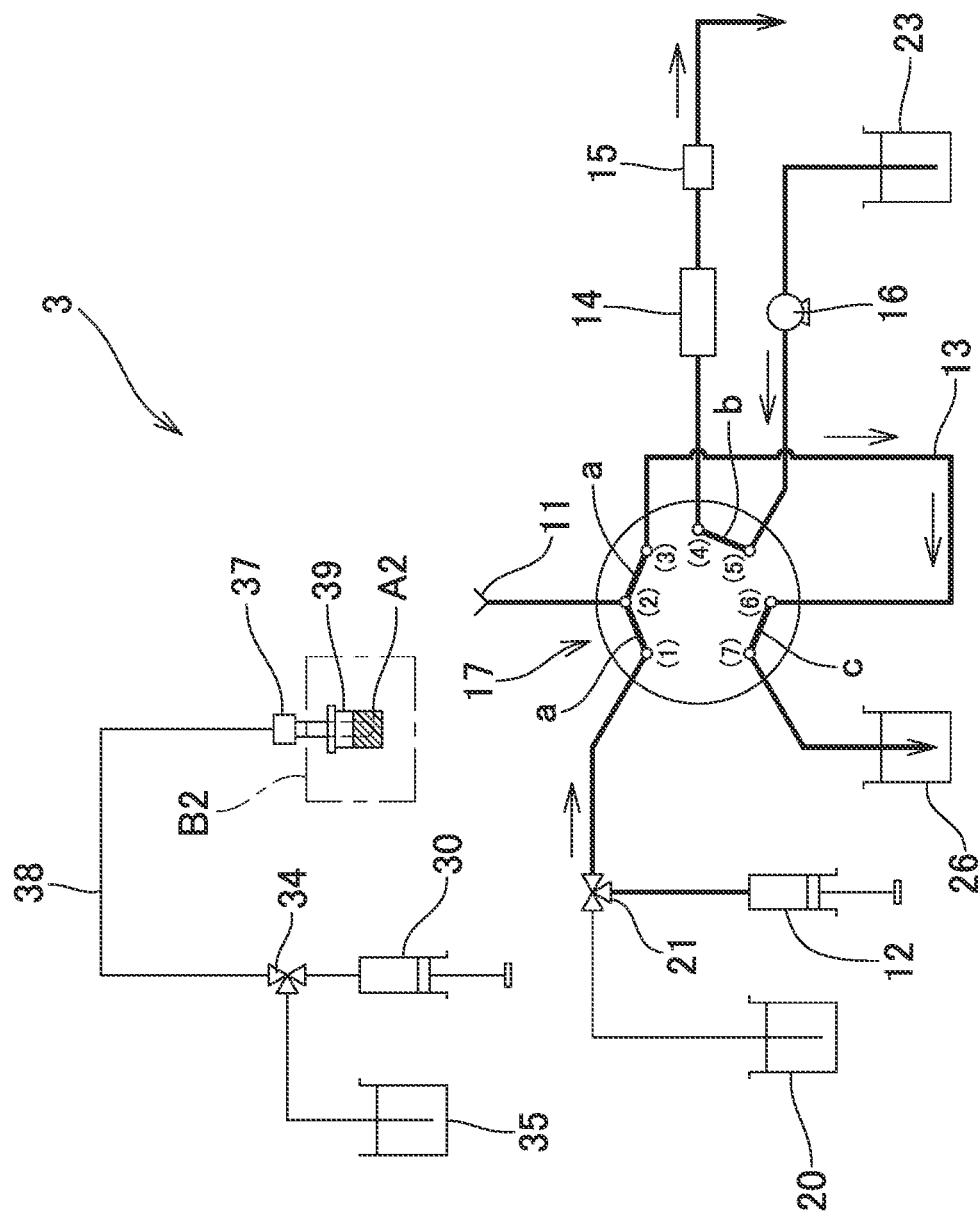
FIG. 9 is an explanation drawing for showing a passage configuration of the liquid chromatograph according to the example of the second embodiment, and shows a state where samples in a sample container are collected during mixed liquid preparation processing.

FIG. 8 shows a passage configuration of the liquid chromatograph 3 during the preparation processing. The liquid chromatograph 3 has a configuration in which the sample receiving part 11 is coupled and detached to/from the needle 37a of the connecting portion 37 in the liquid tight manner. The sample receiving part 11 receives a sample A2 supplied using a preparation liquid supply pump 30 serving as the sample supply pump. The pump 30 is connected to the connecting portion 37 through a passage 38. The connecting portion 37 has the needle 37a and a main body 37b continuously provided from the needle 37a. The main body 27b will be united with the driving mechanism D, when the driving mechanism D (see FIG. 12) is provided, as in the case of the first embodiment. On a preparation stand B2, a sample container 39 in which the sample A 2 is contained is placed.

The operation of the liquid chromatograph 3 is described with reference to FIGS. 8 to 11, 12, and 13. Operations same as those of the liquid chromatograph 1 shown in FIG. 1 are briefly described with reference to FIGS. 1 to 6, depending on the necessity. An example of the electric configuration of the liquid chromatograph 3 shown in the block diagram of FIG. 12 does not include the solvent switch valve 29. Other electric configurations of the liquid chromatograph 3 are the same as those of the liquid chromatograph 1. Accordingly, the description is provided with reference to FIG. 12.

For example, the pumps 12, 16, and 30 may be suspended and the connecting portion 37 is not connected to the sample receiving part 11. Even in such a suspended situation, the liquid chromatograph 3 can restart an operation after the needle 37a of the connecting portion 37 is connected to the sample receiving part 11 in the liquid tight manner. After the operation is started, the preparation/washing processing unit 42 causes the passage switch valve 17 to be positioned in the load position (Step S1). If the driving mechanism D is provided, operation can be started from the aforementioned suspended state. When the operation is started, the driving mechanism D is driven for connecting the connecting portion 37 to the sample receiving part 11 in the liquid tight manner, and then causes the valve 17 to be switched to the load position (Step S1).

After Step S1, the preparation/washing processing unit 42 causes the pumps 12, 16, and 30 to operate for performing the preparation processing (Step S2). In Step S2, the pumps 12 and 30 operates for sending the preparation liquid to the passage 38, the passage (a), the sample loop 13, and the passage (c). The pump 16 operates for sending the mobile phases to the passage (b) and the analysis column 14. Before Step S2 starts, the sample container 39 in which the sample A2 is contained is placed on the preparation stand 132.

After Step S2, the mixed liquid preparation step is performed for preparing the mixed liquid (Step S3). In Step S3, the following processing is performed: (i) the mixed liquid preparation unit 40 causes the pump 16 to operate, while causing the pumps 12 and 30 to be suspended, causes the connecting portion 37 to be removed from the sample loop receiving part 11, and causes the needle 37a of the connecting portion 37 to be inserted in the sample container 39, thereby causing the pump 30 to operate for absorbing and collecting the sample A2 (see FIG. 9); (ii) after absorbing a predetermined amount of the sample A2, the pump 30 is suspended and the needle 37a and the sample receiving part 11 are connected to each other again in the liquid tight manner; and (iii) thereafter, the pumps 12 and 30 are driven again, and the sample A2 and the mixture solvent are mixed in the passage (a). The obtained mixed liquid is held in the sample loop 13 (see FIG. 10). Detailed operations are the same as those in the first embodiment.

After Step S3 is performed for a predetermined time period, for example, the valve 17 is positioned in the injection position (Step S4). In Step S4, the analysis unit 41 causes the valve 17 to be positioned in the injection position, to thereby form the passages (d), (e), and (f). At this time, pumps 12, 18, and 30 are suspended, but the pump 16 continuously operates.

Figure 11:
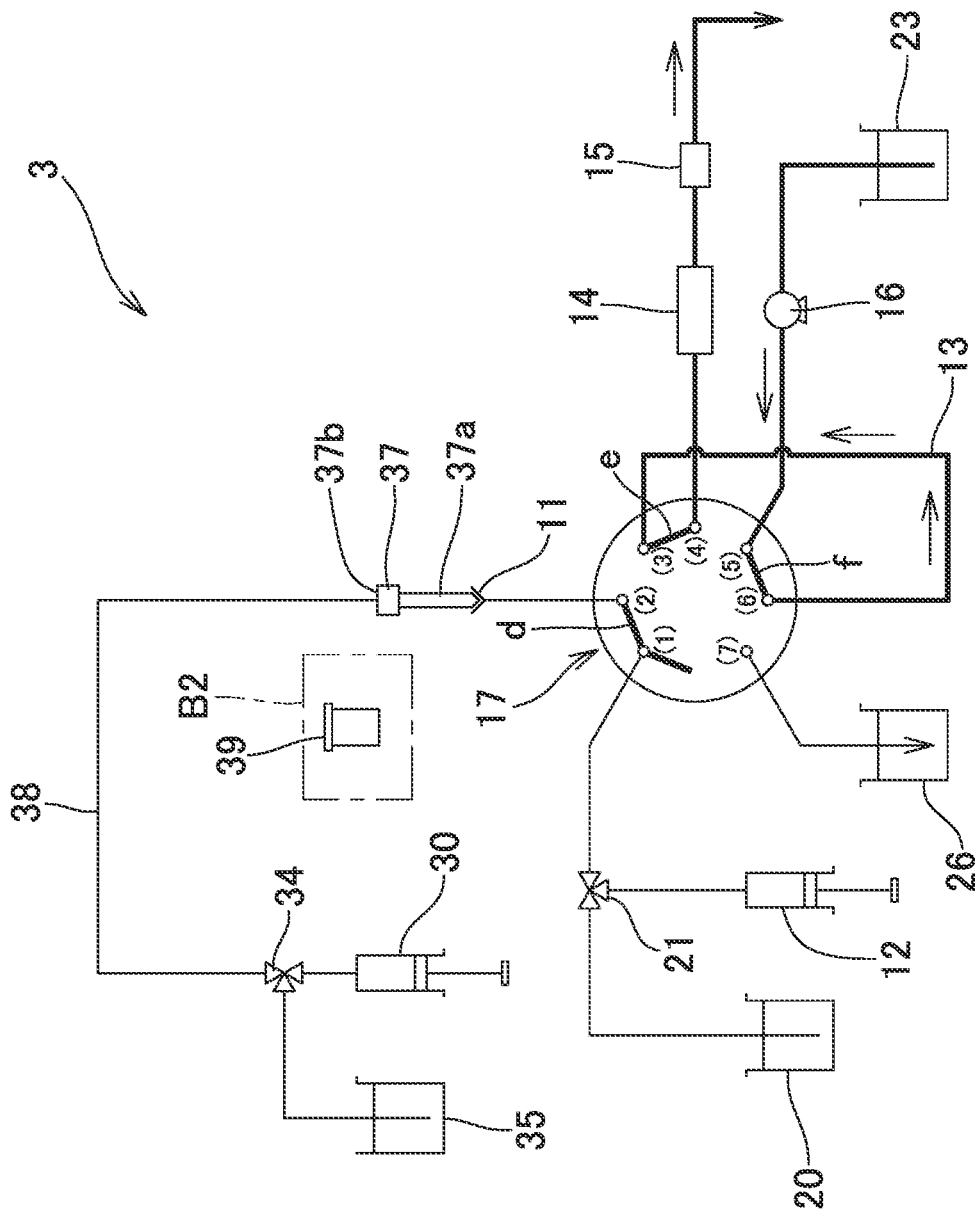
FIG. 11 is an explanation drawing showing a passage configuration of the liquid chromatograph according to the example of the second embodiment, and shows a state where analysis processing is performed with the passage switch valve being in the injection position.

After Step S4, the analysis unit 41 is used to perform the analysis processing 1 (Step S5), in the manner same as that in the example shown in FIG. 1. Here, the exchange to the connecting adopter 36 is not conducted unlike the example shown in FIG. 1, as shown in FIG. 11.

After a predetermined period of time passes from the start of Step S5, the valve 17 is positioned in the load position (Step S6). Then, in the same manner as in the example shown in FIG. 1, the analysis unit 41 causes the mobile phase to be supplied through the passage (b), to thereby perform analysis processing 2 in which the mixed liquid is continuously sent to the analysis column (Step S7). In Step S7, after the whole mixed liquid passes through the analysis column 14 and signals based on the components are not detected in the detector 15, it is preferable that the mobile phase is continuously supplied for washing the inside of the analysis column 14 and the passages.

Figure 10:
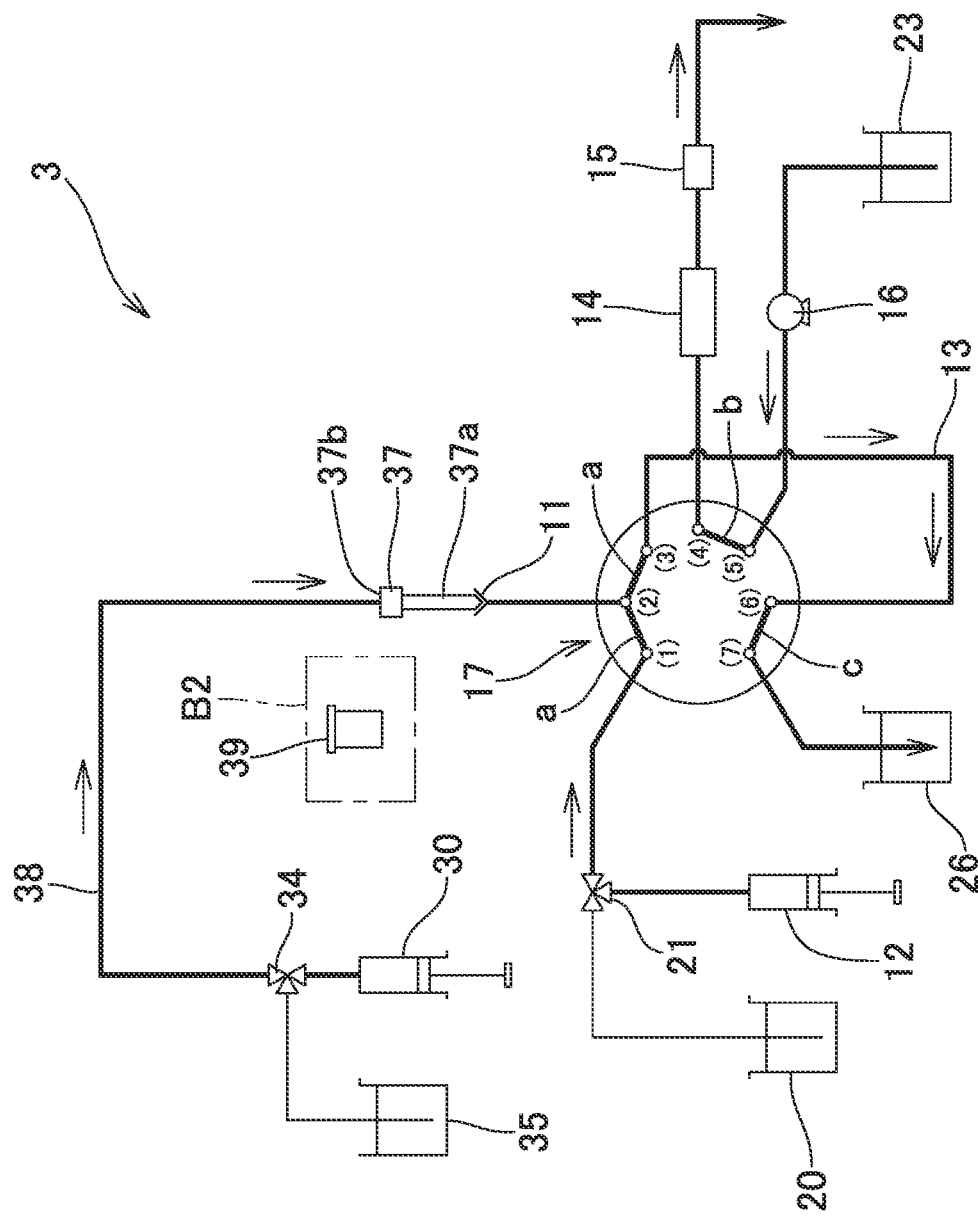
FIG. 10 is an explanation drawing for showing a passage configuration of the liquid chromatograph according to the example of the second embodiment, and shows a state where the mixed liquid of a sample and a mixed solvent is held in a sample loop during the mixed liquid preparation processing.

The washing processing is performed (Step S8) in parallel to Step S7. In Step S8, the following processing is performed: the preparation/washing processing unit 42 causes: (i) the pump 30 to operate for discharging the preparation liquid as the cashing liquid to the waste liquid container 26 through the passage 38, the passage (a), the sample loop 13, and the passage (c); and (ii) the pump 12 to operate for discharging the mixture solvent as the washing liquid to the waste liquid container 26 through the passage (a), the sample loop 13, and the passage (c). The processing (i) and the processing (ii) are simultaneously performed, so drat washing liquids in (i) and (ii) are joined in the port 2 of the valve 17. FIG. 10 substantially shows a state where the processing in Steps S6 to S8 is performed.

The analysis processing and the washing processing are performed for a predetermined period of time, then the analysis unit 41 causes the pump 16 to be suspended, and the preparation/washing processing unit 42 causes the pumps 12, 18, and 30 to be suspended. Thus, a series of processing is terminated. The needle 37a of the connecting portion 37 may be removed from the sample receiving part 11, as needed. If the driving mechanism D is provided, the preparation/washing processing unit 42 may cause the driving mechanism D to operate after causing the pumps 12 and 30 to be suspended, for moving the connecting portion 37 to thereby remove the connecting adopter 36 from the sample receiving part 11.

In the second embodiment, the passage switch valve 17a shown in FIG. 7 can be used, as in the case of the first embodiment.

REFERENCE SIGNS LIST 1, 2, 3 . . . Liquid chromatograph;
11 . . . Sample receiving part;
12 . . . Mixture solvent supply pump;
13 . . . Sample loop;
13a . . . One end of sample loop;
13b . . . The other end of sample loop;
14 . . . Analysis column;
15 . . . Detector;
16 . . . Mobile phase supply pump;
17a . . . Passage switch valve;
18 . . . Eluent solvent supply pump;
19 . . . Solid phase cartridge;
20 . . . Mixture solvent container;
21, 33, 34 . . . Three-way valve,
22, 24, 25, 28, 28a, 28b, 38 . . . Passage;
23 . . . Mobile phase storage container;
26, 31 . . . Waste liquid container;
27, 37 . . . Connecting portion;
27a . . . Nozzle;
27b, 37b . . . Main body;

29 . . . Solvent switch valve:
30 . . . Preparation liquid supply pump;
32 . . . Eluent solvent container;
35 . . . Preparation liquid container;
36 . . . Connecting adopter;
37a . . . Needle;
39 . . . Controller;
40 . . . Mixed liquid preparation unit;
41 . . . Analysis unit;
42 . . . Preparation/washing processing unit;
43 . . . Sample container;
A, A2 . . . Sample;
B, B2 . . . Preparation stand;
D . . . Driving mechanism

The invention claimed is:

1. A liquid chromatograph comprising:
a sample receiving part that receives a sample supplied by a sample supply pump;
a mixture solvent supply pump for supplying a mixture solvent to be mixed with the sample at a predetermined mixture ratio;
a sample loop that temporarily contains a mixed liquid of the sample and the mixture solvent, and has one end and an other end;
an analysis column that performs separation on the sample into components;
a detector that detects the components obtained by the separation in the analysis column;
a mobile phase supply pump for sending a mobile phase to the analysis column; and
a passage switch valve capable of switching a passage between a load position where the mixed liquid is temporarily held in the sample loop and an injection position where the mixed liquid held in the sample loop is sent to the analysis column, wherein
the passage switch valve has ports each of which is individually connected to: the sample receiving part; the mixture solvent supply pump; the one end and the other end of the sample loop; the analysis column; and the mobile phase supply pump,
in the load position, passages (a) and (b) are formed, the passage (a) allowing communication between the ports respectively connected to the mixture solvent supply pump, the sample receiving part, and the one end of the sample loop, and the passage (b) allowing communication between the ports respectively connected to the mobile phase supply pump and the analysis column, and
in the injection position, passages (d), (e), and f are formed, the passage (d) allowing communication between the ports respectively connected to the sample receiving part and the mixture solvent supply pump, the passage (e) allowing communication between the ports respectively connected to the one end of the sample loop and the analysis column, and the passage f allowing communication between the ports respectively connected to the other end of the sample loop and the mobile phase supply pump.

2. The liquid chromatograph according to claim 1, wherein
the passage switch valve has a waste liquid port that is connected to a waste liquid container for collecting a waste liquid,
in the load position, a passage (c) allowing communication between the waste liquid port and the port connected to the other end of the sample loop is formed, and
in the injection position, the waste liquid port communicates with none of the ports.

3. The liquid chromatograph according to claim 1, comprising
a controller configured to perform a mixed liquid preparation step and an analysis step after the mixed liquid preparation step,
in the mixed liquid preparation step, the controller causes:
the passage switch valve to be in the load position;
the sample injected by the sample supply pump and the mixture solvent injected by the mixture solvent supply pump to be joined in the passage (a) at a predetermined mixture ratio; and
the mixed liquid to be sent from the one end of the sample loop to the other end thereof to be held in the sample loop,
in the analysis step, the controller causes:
the passage switch valve to be in the injection position;
the mobile phase to be sent by the mobile phase supply pump from the other end of the sample loop to the one end thereof through the passage f; and
the mixed liquid held in the sample loop to be sent to the analysis column through the passage (e).

4. The liquid chromatograph according to claim 1, wherein
the sample loop is provided with an oscillation imparting mechanism that promotes mixture of the sample and the mixture solvent.

5. The liquid chromatograph according to claim 1, comprising:
a sample container that contains the sample;
a connecting portion provided with a needle detachably connected to the sample container and the sample receiving part; and
the sample supply pump for absorbing and discharging the sample through the needle.

6. The liquid chromatograph according to claim 5, comprising
a driving mechanism that moves the connecting portion.

7. The liquid chromatograph according to claim 1, comprising:
a solid phase cartridge detachably attached to the sample receiving part, the solid phase cartridge carrying the sample in advance,
an eluent solvent supply pump serving as the sample supply pump, for supplying an eluent solvent for eluting the sample carried by the solid phase cartridge, and
a connecting portion connected to the eluent solvent supply pump and detachably coupled to the solid phase cartridge.

8. The liquid chromatograph according to claim 7, comprising:
a solvent switch valve in a passage between the eluent solvent supply pump and the connecting portion, wherein
the solvent switch valve has ports respectively connected to: the connecting portion; the eluent solvent supply pump; and a preparation liquid supply pump for supplying a preparation liquid that does not elute the sample carried by the solid phase cartridge, and
the solvent switch valve is capable of switching a passage g allowing communication between the eluent solvent supply pump and the connecting portion, and a passage i allowing communication between the preparation liquid supply pump and the connecting portion.

9. The liquid chromatograph according to claim 7, comprising
a driving mechanism that moves the connecting portion.

10. The liquid chromatograph according to claim 7, comprising
a connecting adopter capable of being detachably attached, in place of the solid phase cartridge, to the sample receiving part and the connecting portion, the connecting adopter allowing, after the mixed liquid in the sample loop is sent to the analysis column, the eluent solvent to be supplied as a washing liquid, in the load position.

11. The liquid chromatograph according to claim 10, wherein the preparation liquid is supplied as the washing liquid.

* * * * *